Aug. 23, 1932.  M. B. WOOD  1,873,238
OFF-PEAK POWER AND METERING SYSTEM AND APPARATUS
Filed Nov. 2, 1929
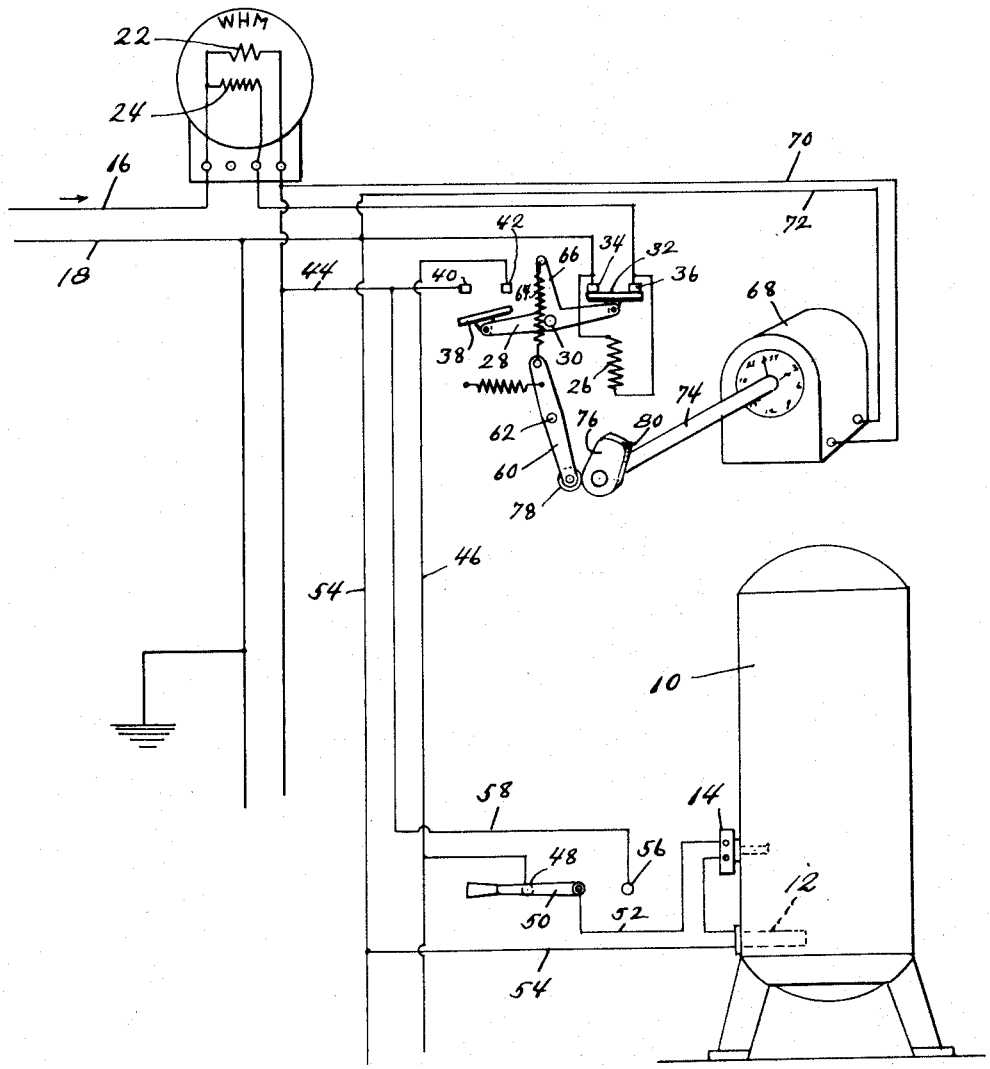
Inventor.
Morris B. Wood
by
atty

Patented Aug. 23, 1932

1,873,238

UNITED STATES PATENT OFFICE

MORRIS R. WOOD, OF NEWBURYPORT, MASSACHUSETTS, ASSIGNOR TO THE CHASE-SHAWMUT COMPANY, OF NEWBURYPORT, MASSACHUSETTS, A CORPORATION OF MASSACHUSETTS

OFF-PEAK POWER AND METERING SYSTEM AND APPARATUS

Application filed November 2, 1929. Serial No. 404,491.

This invention relates to electric distribution systems and particularly to a system for connecting power consuming devices to an electric supply circuit at times of low power consumption or off-peak load on the supply circuit and for metering the power consumed for such devices at a lower rate than for the power consumed at other periods.

The usual distribution system has periods, known as off-peak periods, when the demand for power is relatively small and when power is usually sold at a lower rate than during other periods. There are certain power consuming devices, as, for instance, those for electrically heating and storing water that are well adapted to be operated at off-peak periods and, in the case of water heating, the hot water can be stored for use at times other than off-peak periods.

Since the charges for normal and for off-peak power are different, it is usual to provide one meter for measuring the normal power and a second meter for measuring the off-peak power. This method thus involves the use of two meters which increases the expense of an installation and also complicates the bookkeeping system.

It is an object of the present invention to meter both the normal power and the off-peak power with one metering instrument, and to cause the meter automatically to operate at the off-peak period at a different and slower rate which is proportional to the difference in cost between the normal and the off-peak power.

A further object of the invention is the provision of means to connect the off-peak load with the circuit at the beginning of the off-peak period and at the same time to alter the rate of operation of the meter to correspond with the off-peak charge for power and to disconnect the off-peak load from the circuit and restore the meter to its normal rate of operation at the end of the off-peak period.

A further object of the invention is the provision of means responsive to the energization of the power circuit to connect the off-peak load to the circuit during the off-peak period which means shall be so arranged that the beginning or termination of the off-peak period is delayed for so long as the power circuit remains without energy, thereby providing a full period of off-peak power regardless of the failure of power on the supply circuit.

A further object of the invention is generally to improve upon off-peak metering and load supplying systems.

The figure is a diagrammatic representation of the off-peak metering and load supplying system and apparatus embodying the present invention.

As here shown, the off-peak power consuming device is illustrated as a hot water heating and storing apparatus consisting of the storage tank 10, the electric heater 12, and the circuit opening and closing thermostat 14 which is adapted to close the circuit through the heating element when the water in the tank is cold and to open the circuit when the water is hot. The power for operating the heating device is supplied by the conductors 16 and 18 of a supply circuit and is metered by the usual type of watt hour meter having the current winding 22 which is in series with the load and the potential winding 24 which is energized by the potential of the circuit.

In accordance with this invention, means are provided to cause the meter to operate at a low rate during the off-peak period, and also to connect the load consuming device to the power circuit at such time. To this end, a resistance 26 is arranged in series with the potential winding 24. During the normal power period of the supply circuit, the resistance is shunted out of the circuit of the potential coil. During the off-peak period, however, the shunt is removed and the resistance is included in series with the potential coil. Due to the resistance, the meter operates at a slower rate than when the resistance is out of the circuit and thus permits more power to be drawn from the supply circuit than is recorded by the meter. The value of the resistance is such as to cause the meter to read low by an amount which is proportional to the difference between the rates for normal and off-peak power. Thus, while the customer will be billed at the rate for normal power, his charge will be less than for the total power he has actually used, with the result that the off-peak power costs less than the normal power.

The resistance 26 and also the load device 10 is cut into and out of circuit at the beginning and end of off-peak period by a time controlled switch herein diagrammatically shown as including the switch arm 28 which is pivoted in the middle on a pin 30. Said arm carries at one end a movable bridging member 32 that is arranged to engage and disengage contact members 34 and 36 that are connected to the terminals of the resistance 26, whereby to shunt the resistance into and out of the circuit of the potential winding 24. A second bridging member 38 is carried by the other end of said switch arm and is adapted to engage stationary contact members 40 and 42 which control the energization of the off-peak load circuit. The contact member 40 is connected through a conductor 44 and through the series winding 22 of the watt hour meter with the conductor 16 of the supply circuit. The contact member 42 is connected by a conductor 46 with the stationary contact member 48 of a double throw switch, the movable member 50 of which is connected by a conductor 52 in series with the thermostatic switch 14 and one terminal of the heating element 12. The other terminal of the heating element is connected by a conductor 54 to the other conductor 18 of the supply circuit. Thus, when the bridging member 38 engages its stationary contact members 40 and 42, the heating element 12 is connected to the supply circuit, providing the double throw switch is in the position shown which is the normal position.

If the load 10 is desired to be operated at normal periods, the double throw switch is operated to move its movable member 50 into engagement with the other contact member 56 thereof which serves to connect the conductor 52 of the heating element with the conductor 58 and through said conductor and the conductor 44 with the supply conductor 16, thereby cutting out the time controlled switch.

When the load controlling switch comprising the bridging member 38 and the contact members 40 and 52 is closed, the resistance controlling switch is open, thereby removing the shunt from the resistance and thus including it in the circuit of the potential winding 24.

The operating mechanism of the switch includes a cam arm 60 which is pivoted in its middle on the pin 62 and has at its upper end a spring 64, the upper end of which is connected with an arm 66 of the switch arm 28. The arrangement is such that when the cam arm 60 moves the spring 64 from one side to the other of the pivot point 30, the switch is caused to move rapidly in one direction or the other. The operation of the switch is controlled by timing mechanism 68 which preferably is driven by a synchronous electric motor which is now common in the art and need not be further shown and that is connected by the conductors 70 and 72 with the conductors 16 and 18 of the power circuit. With this type of timing mechanism, the power circuit is usually provided with a time-controlled mechanism that maintains a constant average frequency on the circuit and thus causes the accurate timing of said time controlled mechanism. Said mechanism is provided with a shaft 74 that, if the supply circuit has but one off-peak period in a day, rotates once in twenty-four hours. Said shaft is provided with a cam 76 that engages the cam roller 78 the lower end of the cam arm 60 and has a working face 80, the extent of which corresponds with the extent of the off-peak period. With this arrangement, when the working face 80 is travelling over the cam roller 78, the load controlling switch is maintained closed and the resistance controlling switch is maintained open, thus supplying off-peak power to the load device and metering of such power at a reduced rate. When the working portion 80 of the cam passes beyond the roll 78, the spring 82 connected with the cam arm moves the switch in the opposite direction and thus opens the circuit for the load device and restores the meter to its normal rate of operation.

The synchronous motor that drives the timing mechanism 68 depends for its operation upon the maintenance of energy in the supply circuit and when the supply circuit is without power, the timing device does not operate. Since the cam 76 is adjusted to provide a certain time during which off-peak power may be taken from the supply circuit, the failure of power on the supply circuit does not limit the extent of time during which off-peak power may be used. Consequently, the customer can use the full period for off-peak power when power is restored to the circuit, regardless of how long the power has been off, although the off-peak power may be taken during the normal period of the circuit. This arrangement thus provides a customer with a full extent of service for which he has contracted and penalizes the power company for the failure of power.

I claim:

1. An electric power distribution system having a meter having a normal rate of operation for recording the power consumed in the system, a load circuit, means governed by the energization of the system for connecting said circuit to the system, and means operated upon the connection of the load circuit to alter the rate of operation of the meter.

2. The combination of a power circuit, a watt hour meter for recording the power consumed in the circuit, an off-peak power consuming device adapted to be connected to the circuit at times of low power demand thereon, and time controlled means operative only when said power circuit is energized for connecting said load device to the circuit and also for reducing the rate of operation of said meter, whereby to cause said meter to record a lesser amount of power than is actually used by said load device during its period of connection to the system.

3. The combination of a power circuit, a load circuit, and means for supplying said load circuit with power from said power circuit for a predetermined period of time, said means including a switch for connecting and disconnecting said circuits and controlling means for said switch including timing mechanism controlling the opening and closing of said switch and energized from said power circuit and operative only when said power circuit is energized.

4. The combination of a power circuit, a load circuit, and means for supplying said load circuit with power from said power circuit for a predetermined period of time, said means including a switch for connecting and disconnecting said circuits and controlling means for said switch including timing mechanism controlling the opening and closing of said switch and having means controlled by conditions of said power circuit for controlling the starting and stopping thereof.

5. The combination of a power circuit, a load circuit, and means for supplying said load circuit with power from said power circuit for a predetermined period of time, said means comprising a switch for connecting and disconnecting said circuits and time controlled operating mechanism for said switch including a synchronous motor driven by said power circuit, and means operated by said motor for operating said switch.

In testimony whereof, I have signed my name to this specification.

MORRIS B. WOOD.